Nov. 17, 1959  A. L. MARKS  2,912,783
FISHING LURE WITH LUMINESCENT EYES
Filed June 4, 1957
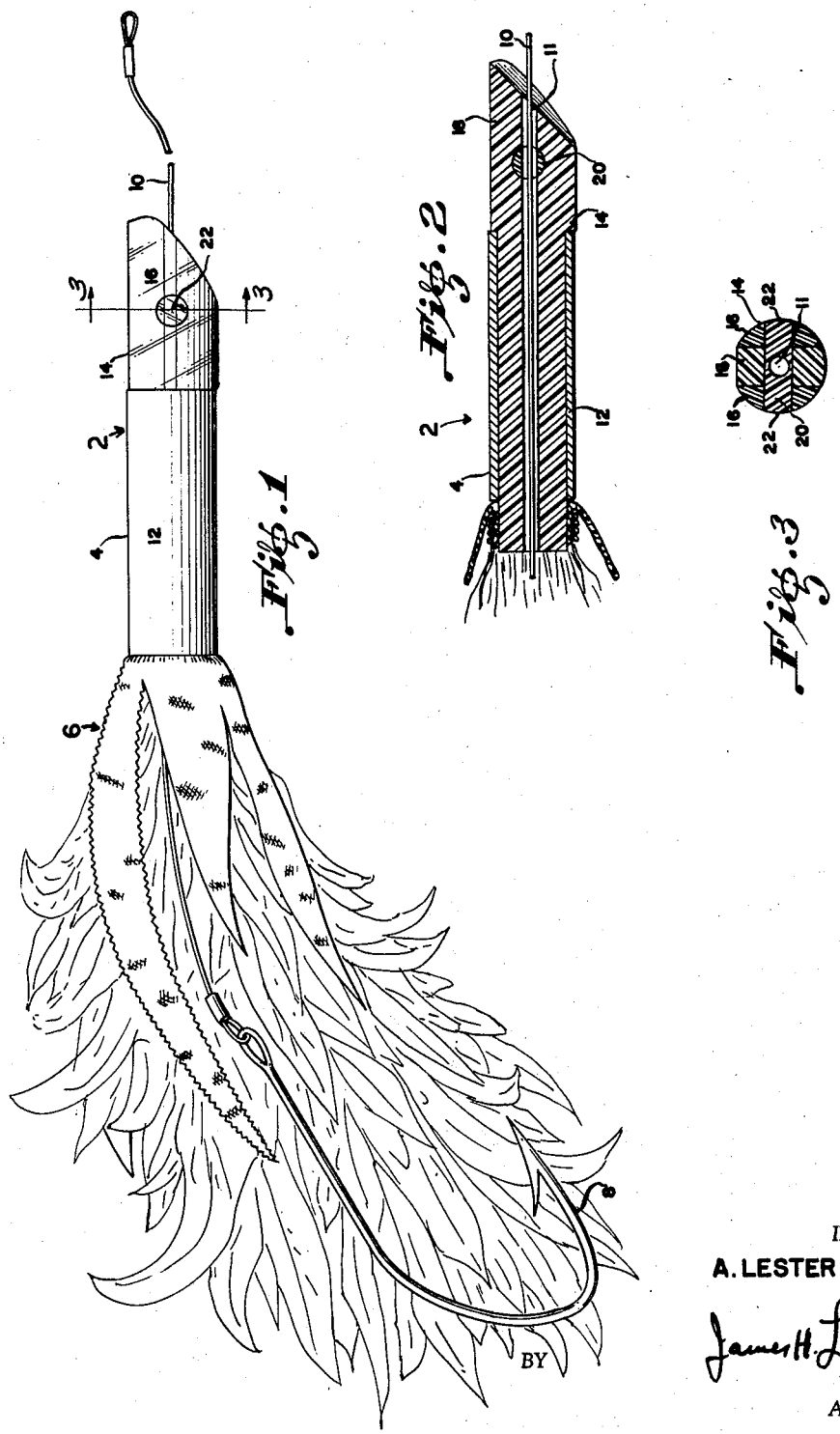
INVENTOR
A. LESTER MARKS
ATTORNEY

United States Patent Office 2,912,783
Patented Nov. 17, 1959

2,912,783

FISHING LURE WITH LUMINESCENT EYES

Alfred Lester Marks, Honolulu, Hawaii

Application June 4, 1957, Serial No. 663,458

2 Claims. (Cl. 43—42.05)

This invention relates to fishing lures and, more particularly, to lures having translucent or transparent ornamentation.

The primary object of the invention is to provide a lure for simulating a minnow or other bait with luminous eyes. While various types of reflectors and non-precious jewels have heretofore been utilized to provide flashing-eyed plugs, the object now is to provide a lure which will pick up light from above or below and transmit the light to the eye region of the body and also beyond the eye region to the under side of the body. By surrounding the eye region with opaque or semi-opaque material, there results the illusions of eye luminescence. A further object of the invention is to form simulated eyes of virtually transparent colored plastic material, such as pink "Lucite" so that a "bugging" or outwardly bulging effect is created to simulate the species of bait upon which big game fish oftentimes feed.

These and other objects will be apparent from the following specification and drawing, in which:

Fig. 1 is a side elevation of the lure;

Fig. 2 is a longitudinal section view of the lure body; and,

Fig. 3 is a cross-section along the line 3—3 of Fig. 1.

Referring now to the drawing, the fishing lure 2 has a torpedo-shaped body 4 terminating in brilliant natural and artificial feathers 6 which conceal a hook 8 on a leader 10. Leader 10 runs through a bore 11 therefor running lengthwise through the body. The quills of feathers 6 are attached at the back of a bright metal sleeve 12 which forms the rear portion of body 4 and projecting from the front portion of the sleeve is a plastic head 14.

Head 14 is formed of Lucite, or the like resinous plastic characterized by almost totally reflective inner surfaces and by its resultant ability to transmit light, the head comprising a sandwich of two outer plies 16 and a central ply or strip 18, bonded to one another. The outer surfaces of outer plies 16 are dyed or otherwise treated to render them semi-opaque or, if preferred, the outer plies may be formed of completely opaque or semi-opaque material. Inner ply 18, which is an integral flat extension of the body, is clear and undyed. A rod 20, also of clear light-transmitting plastic material, extends from side-to-side cemented into a transverse bore through the head. Preferably, rod 20 has color, such as pink, and the ends of the rod should be rounded off to simulate bulging eyes 22.

In operation, when the lure is trolled through the water, a portion of the light entering through the top or bottom surfaces of inner ply 18 enters rod 20 and is transmitted to the outer ends, thereby causing eyes 22 to appear luminous. The contrast between the luminous eyes 22 and the semi-opaque outer plies 16 is striking and gives the appearance of a live minnow or fish.

The invention is not limited to the details illustrated and described herein, but is intended to cover all substitutions, modifications and equivalents within the scope of the following claims:

I claim:

1. In a torpedo-shaped fish-simulating lure, a cylindrical plug formed of plastic material and an integral flat central strip projecting axially from one end thereof, a sleeve fitting around said plug, a ply formed of plastic material integrally bonded on each side of said strip with the longitudinal edges of the strip being exposed, said strip and plies having a common transverse bore extending completely therethrough, a rod formed of plastic material fitting in said bore and extending completely through said strip and plies, the material from which said plug, strip and rod are formed being substantially clear and characterized by excellent light transmitting properties, whereby light impinging on the longitudinal edges of the strip is transmitted to the ends of the rod, said sleeve being opaque, and the material forming said plies being semi-opaque, whereby to provide areas of contrasting illumination wherein the plug and shell represent the body, the strip and plies represent the head, and the rod represents the eyes of a fish.

2. The combination claimed in claim 1, said plug and strip having a longitudinal bore extending axially therethrough from end to end, a leader engaged through the bore and having opposite ends extending beyond the ends of the plug and strip, and a hook secured on the said leader which projects beyond the plug.

References Cited in the file of this patent

UNITED STATES PATENTS

| | | |
|---|---|---|
| 2,149,464 | Potts | Mar. 7, 1939 |
| 2,485,087 | Diamond | Oct. 18, 1949 |
| 2,528,083 | Ruff | Oct. 31, 1950 |
| 2,650,450 | Grathwohl | Sept. 1, 1953 |
| 2,691,839 | Duerig | Oct. 19, 1954 |